United States Patent [19]

Hogan

[11] 4,239,412
[45] Dec. 16, 1980

[54] CONNECTOR MEANS

[75] Inventor: William F. Hogan, Westville, N.J.

[73] Assignee: Spectrum X-Ray Corporation, Westville, N.J.

[21] Appl. No.: 12,958

[22] Filed: Feb. 16, 1979

[51] Int. Cl.³ .............................................. F16B 1/00
[52] U.S. Cl. .................................. 403/182; 403/328; 403/336
[58] Field of Search ............... 403/180, 182, 327, 328, 403/331, 335, 336; 250/445 T, 490

[56] References Cited

U.S. PATENT DOCUMENTS

| | | | |
|---|---|---|---|
| 3,653,693 | 4/1972 | Wieland et al. | 403/327 X |
| 3,691,866 | 9/1972 | Berkes | 403/327 X |
| 4,082,955 | 4/1978 | Sell | 250/445 T |
| 4,158,777 | 6/1979 | Hogan | 250/445 R |

Primary Examiner—Andrew V. Kundrat
Attorney, Agent, or Firm—Paul & Paul

[57] ABSTRACT

Connector means are disclosed for connecting together two shaft members in coaxial relationship and in preselected angular orientation with respect to each other. The connector means includes a locking bracket which is secured to one end of the first of the shaft members and a receiver which is secured, by way of an adapter, to the end of the second shaft member. The receiver includes a chamber open at its upper end for slidingly receiving the locking bracket. Both the locking bracket and the receiver have radial extensions which extend in the same radial direction relative to the axis of the coaxial shaft members. Supported on the extension of the locking bracket is a housing containing a spring-loaded pop pin having a nose portion adapted to pass through a hole in the locking-bracket extension and into a hole in the receiver extension, thereby to lock the bracket in the receiver. The pop pin is quickly retractable to unlocked position by a cam manually controlled by a lever. A receiver adapter secures the receiver to the second shaft.

4 Claims, 6 Drawing Figures

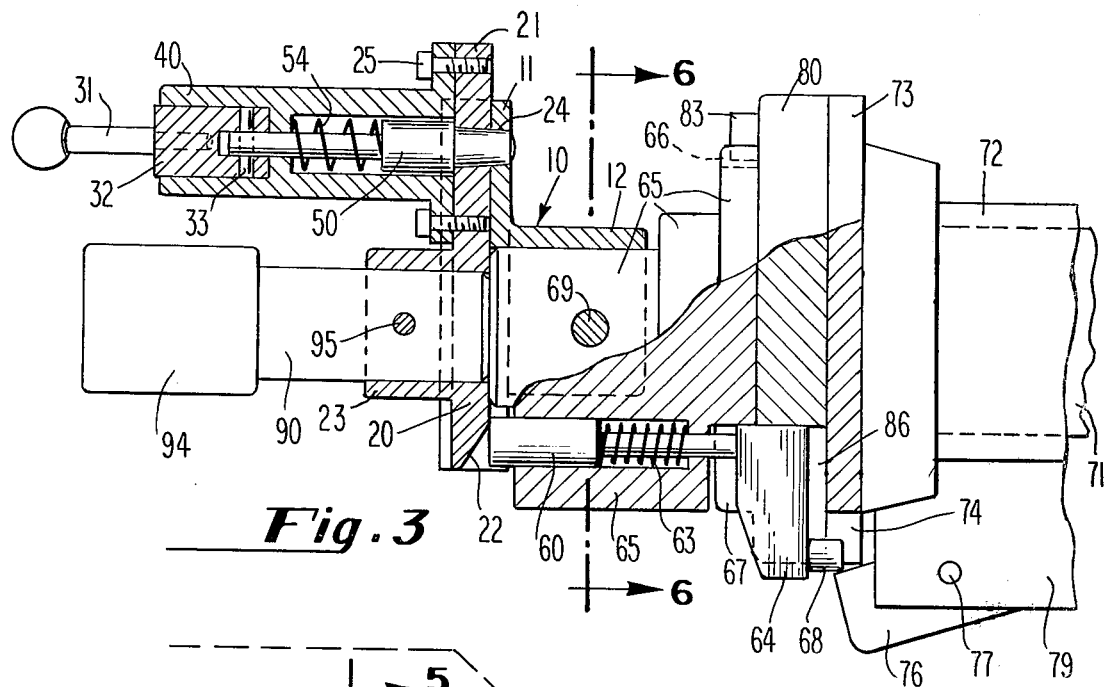
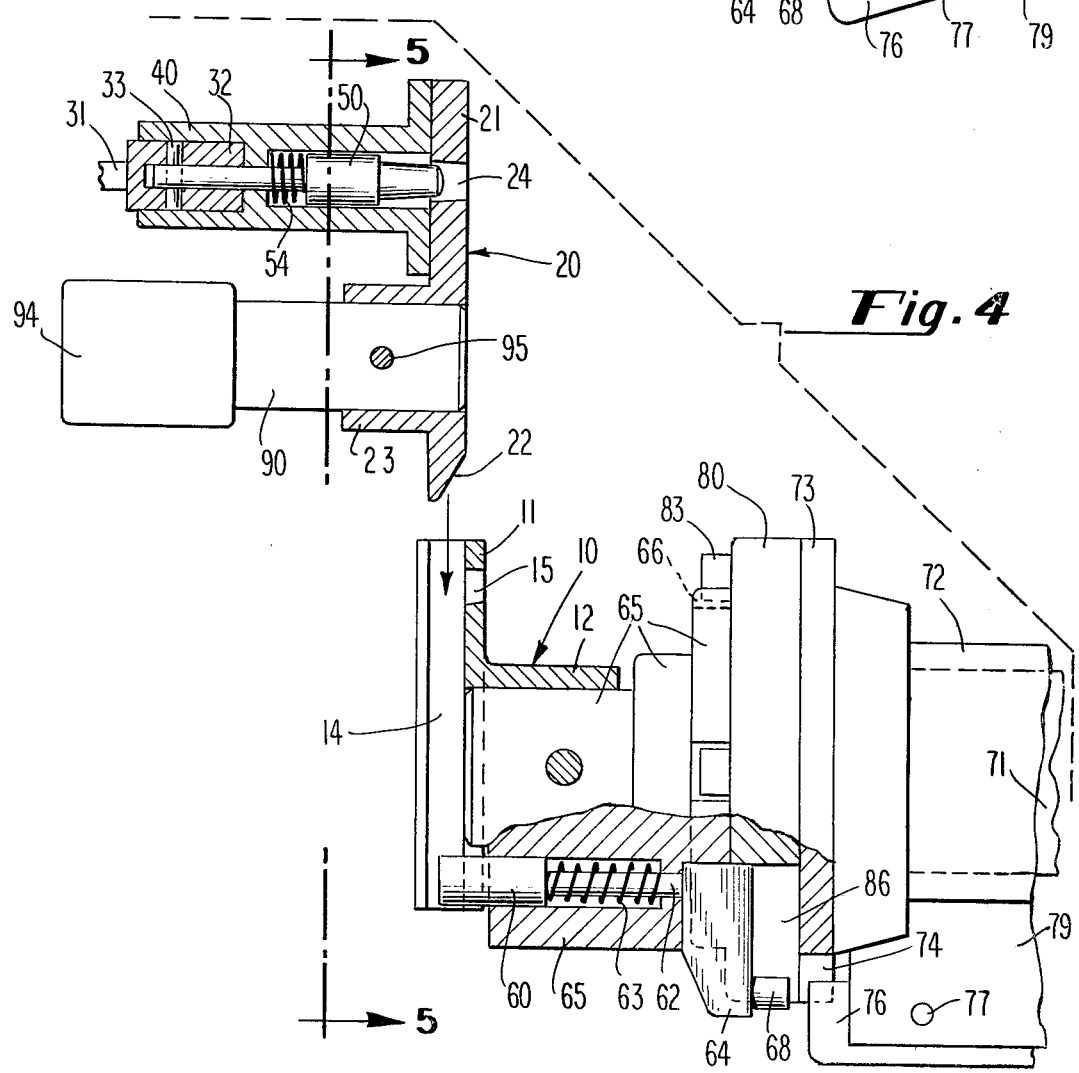

CONNECTOR MEANS

CROSS REFERENCE TO RELATED APPLICATIONS

This application is related to my earlier application, Ser. No. 920,345, filed June 29, 1978, entitled Latching Mechanism.

The connector means shown, described and claimed in the present application represents a simplification and an improvement over the connector mechanism shown in FIGS. 8 and 9 of my earlier application Ser. No. 920,345.

BACKGROUND OF THE INVENTION

This invention relates to manually-operable latching and connector mechanisms which, while having wider applications, are particularly useful in X-ray equipments of the type shown in my co-pending patent applications, Ser. No. 865,172, filed Dec. 28, 1977 and now U.S. Pat. No. 4,158,777 and Ser. No. 920,345 filed June 29, 1978.

The connector means of the present application has particular application in X-ray equipment wherein an X-ray tube and its casing are mounted below a patient-supporting table and an X-ray image-intensifier assembly is supported above the table. Interconnecting the X-ray tube casing and the image-intensifier assembly are extensible-contractable removable link-arm means for coupling the X-ray tube casing and the image-intensifier assembly together so that, when the image-intensifier assembly is moved relative to the patient, coordinated angulation occurs between the X-ray tube and the image-intensifier assembly.

It is highly desirable that such link-arm means be adapted for quick connection to, and quick disconnection from the image-intensifier assembly. The capability for quick disconnection is particularly important in cardiology examinations, so that the attendant will be able to quickly disconnect the link arms and push the image-intensifier assembly away from the patient, to allow the examining physician to provide shock treatment to the chest of the patient in the event of a cardiac arrest.

SUMMARY OF THE INVENTION

The principal object of the present invention is to provide connector means adapted for easy and quick connection of the image-intensifier assembly to, and quick disconnection from, the interconnecting link-arm assembly which extends down and is connected at its lower end to the X-ray tube casing.

The foregoing object is achieved by securing to the image-amplifier assembly, by means of an adapter, a receiver adapted to receive a locking bracket which is secured to the link-arm assembly. Means are provided for locking the locking bracket in the receiver and for securing the receiver and its adapter to the image-intensifier in preselected orientation and for maintaining that orientation as the image-intensifier is moved translationally and angularly.

BRIEF DESCRIPTION OF THE DRAWINGS

FIG. 3 is a side elevational view, partly in section, looking along the lines 3—3 of FIG. 2, showing further details of the connector means, with the locking bracket inserted in the receiver.

FIG. 4 is a side elevational view, generally similar to FIG. 3, showing the locking bracket removed from the receiver.

BRIEF DESCRIPTION OF THE PREFERRED EMBODIMENTS

Figure 1:
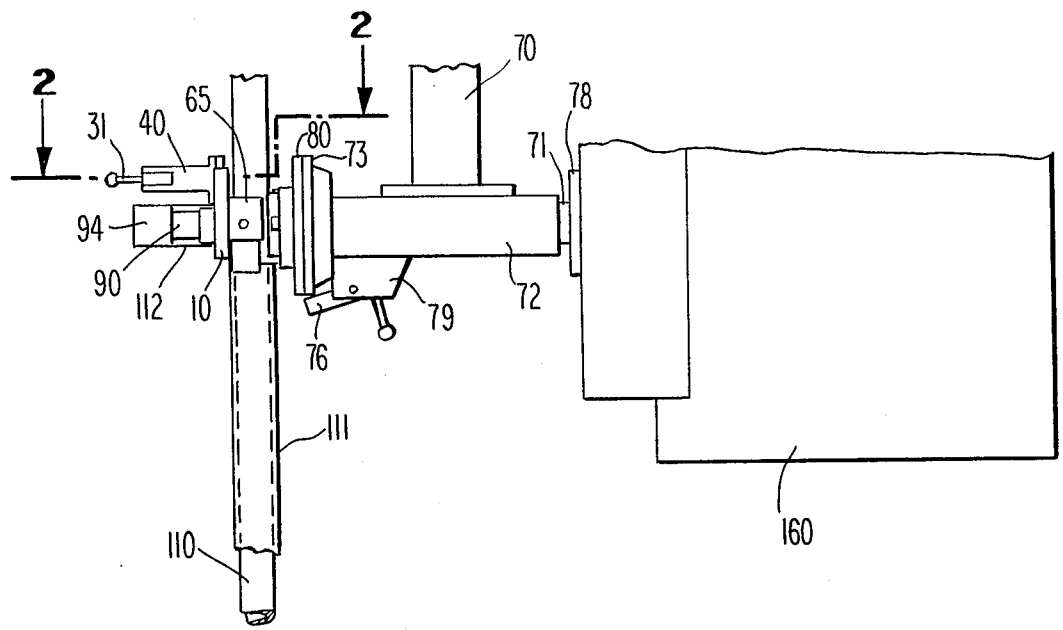
FIG. 1 is a side elevational diagrammatic illustration of an image-intensifier assembly and connector means for connecting the image-intensifier assembly to the upper end of telescoping link arms the lower end of which is connected to the X-ray tube casing.

Referring now to FIG. 1, there is shown diagrammatically an image-intensifier assembly 160 having mounted thereon, as by bracket 78, a stub shaft 71 which projects horizontally and is received within a tubular member 72 which is secured to a vertical telescopic assembly 70 and supported from an overhead crane (not shown). By means of the crane, the image amplifier assembly 160 is movable in any translational direction, and is movable up and down by means of the telescopic assembly 70.

Also illustrated in FIG. 1 is a fragmentary portion of a linkage assembly which includes a generally vertical tubular member 110 which is received telescopically within a second tubular member 111 to which link members 112,94 and 90 are connected at the upper end of member 111. The lower end of tubular member 110 is connected, by various linking members, to the casing of an X-ray tube. Such linkage assembly is shown in my co-pending patent application, Ser. No. 865,172, previously referred to.

As has already been indicated, the object of the present invention is to provide connector means adapted for quick connection and quick disconnection of the linkage assembly to and from the image-intensifier assembly 160. The connector means must also be capable of maintaining proper angular orientation between the linkage assembly and the image-intensifier assembly 160 when the image-intensifier assembly is pushed and pulled to various positions by the attendant. By maintaining proper angular orientation between the image-intensifier 160 and the linkage assembly, a proper angular relationship is also maintained between the image-intensifier assembly 160 and the X-ray tube which is connected to the lower end of the linkage assembly.

The connector means provided by the present invention are intended for use to connect image-intensifier assemblies produced by various manufacturers to the upper end of the link-arm assembly. Accordingly, adapter elements are usually required to be mounted on shaft 71 which is supported in and extends through the tubular housing 72. The remote end of shaft 71 which projects beyond housing 72 is provided with an enlarged integral flange 73 having a notch 74 in its outer periphery located in the vertical plane of the shaft axis. This notch 74 receives the forward end of a spring-loaded trigger arm 76 which is pivotally mounted on pivot pin 77 and supported in ribs 79 which are integral with, and extend downwardly from, the tubular housing 72. The purpose of the spring-loaded trigger arm 76 and notch 74 is to lock shaft 71 against rotation when rotational movement of the image-intensifier assembly is not wanted.

To connect the image-intensifier assembly 160 to the X-ray tube casing through the lock-arm assembly which includes telescopic arms 110,111, an adapter plate 80 is secured, as by bolts, to the flange 73 at the end of shaft 71. Adapter plate 80 is an annular member having a slot 86 located in the vertical plane of the center axis. Proper orientation is obtained by placing plate 80 on end flange 73 in such position that slot 86 of the adapter plate is in registry with notch 74 of the flange 73.

Figures 5, 6:
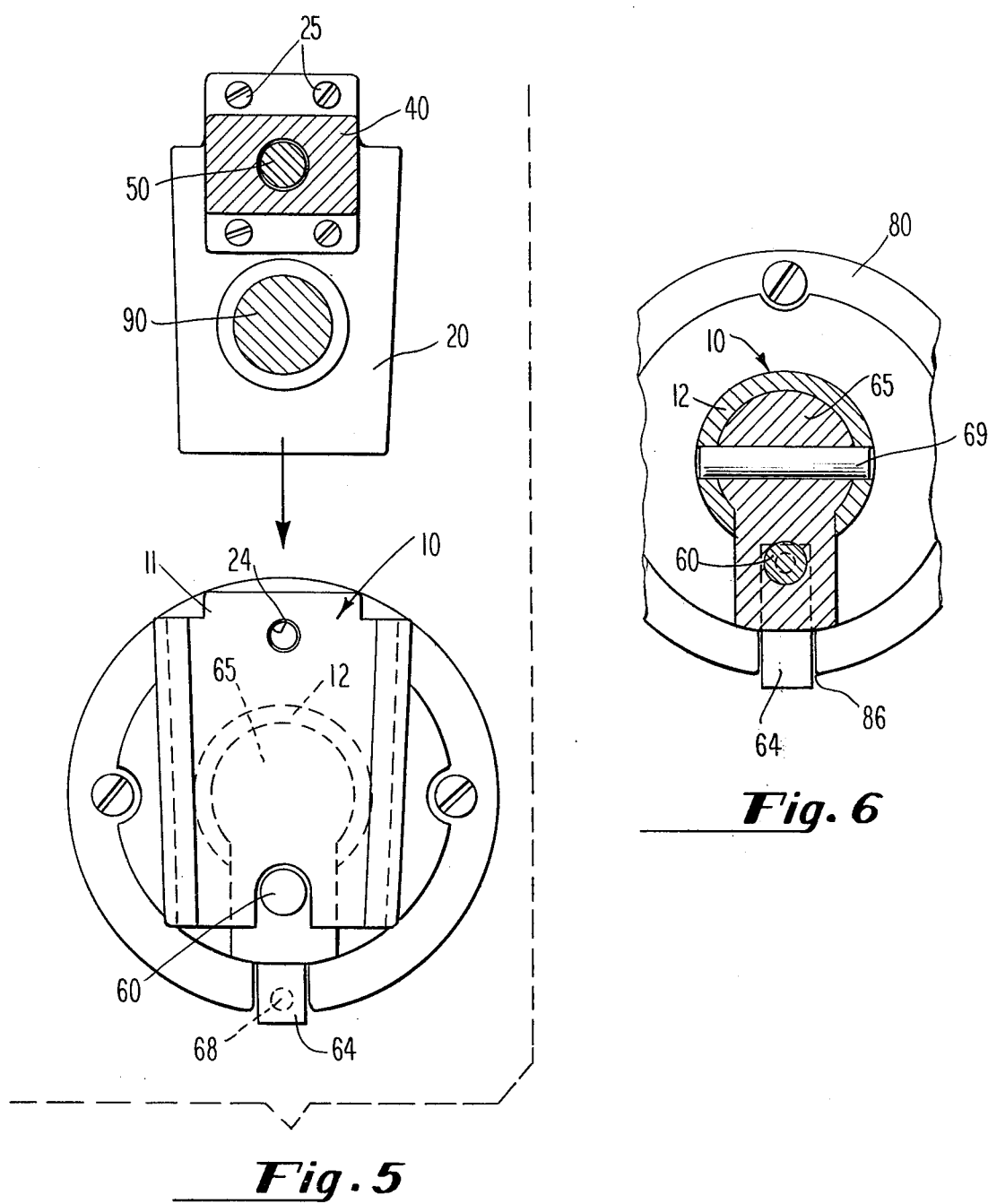
FIG. 5 is an elevational view, looking to the right along the lines 5—5 of FIG. 4.
FIG. 6 is an elevational view, looking to the right along the lines 6—6 of FIG. 6.

The connector means provided in accordance with the present invention, includes a receiver 100 which is secured to the adapter plate 80 through an adapter 65. Adapter 65 is a three-section element having a key-hole shape as viewed in cross section, as is best seen in FIG. 6. The largest diameter section of adapter 65 abuts against adapter plate 80 and is provided with notches 66 which receive studs 83 which project from the adapter plate 80. The adapter 65 and the adapter plate 80 may be secured to flange 73 by common bolts which pass completely through bolt holes in adapter plate 80.

The rectangular lower portion of the adapter 65 is provided with a horizontal cavity containing a spring-loaded plunger 60 having a stem 62 which extends laterally through the housing into a slot 67 in the large-diameter section of adapter 65. Secured to or integral with the projecting end of stem 62 is a slide block 64 having projecting laterally therefrom a pin or stud 68. When slide block 64 is pushed to the right, as illustrated in FIG. 3, and the trigger arm 76 is withdrawn from notch 74, stud 68 enters into notch 74 of the shaft end plate 71. This prevents return of the locking trigger arm 76 into the notch 74, and releases the lock which had prevented rotation of shaft 71 within its housing 72. Thus, the image-intensifier assembly 160 is now permitted to move angularly when the image-intensifier is shoved translationarlly.

Supported on adapter 65 is a lateral extension 12 of a receiver 10. The function of receiver 10 is to receive a locking bracket 20 which is to be secured to stub shaft 90 which is part of the upper end of the linkage assembly. Lateral extension 12 of receiver 10 is of circular C-shape cross-section, as seen in FIGS. 5-6, and is adapted to receive the circular portion of the keyhole-shaped receiver adapter 65, as best seen in FIG. 6.

Figure 2:
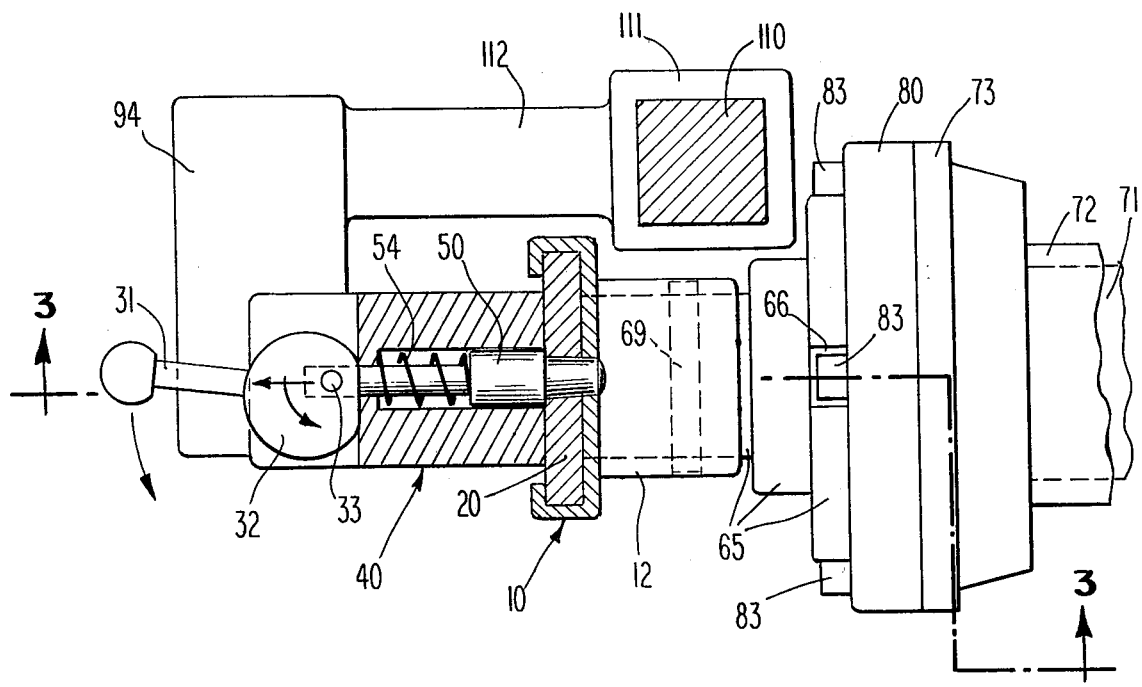
FIG. 2 is a view, partly in section, looking down along the lines 2—2 of FIG. 1 showing details of the connector means.

Receiver 10 has an upstanding vertical section 11 (FIGS. 3-4) which is of rectangular C-shape cross section, as best seen in FIG. 2. Provided in vertical extension 11 is a hole 15 for receiving the nose of a spring-loaded pop pin 50 carried by locking bracket 20.

Locking bracket 20 has a lateral extension 23 of hollow cylindrical configuration for receiving the end of stub shaft 90. As seen best in FIGS. 3-4, stub shaft 90 projects horizontally from link member 94. As seen best in FIG. 2, link member 94 is connected by link arm 112 to vertical tubular arm 111. Stub shaft 90 is connected to lateral extension 23 of locking bracket 20 by a pin 95.

Locking bracket 20 includes, as an integral part thereof, an upstanding vertical extension 21 to which is connected, as by bolts 25, a housing 40 which contains the spring-loaded pop pin 50. When the locking bracket 20 is inserted into receiver 10, as illustrated in FIG. 3, and the lock lever 31 is in the position shown in FIG. 2, the nose of pop pin 50 passes through a hole 24 in the vertical extension 21 of locking bracket 20, and into hole 15 in vertical extension 11 of receiver 10, thereby to lock bracket 20 in the receiver 10. The pop pin 50 is biased toward locking position as by the compression spring 54.

As seen in FIG. 2, pop pin 50 has a shank 53 which is connected, as by a pin 33, to a disc cam 32 the position of which is manually controlled by a lever arm 31. When lever arm 31 is in the position shown in FIG. 2, the biasing spring 54 urges the pin 50 to the right, as viewed in FIG. 2, and, as just described, the nose of pin 50 passes completely through hole 24 in extension 21 of locking bracket 20 and into hole 15 in extension 11 of receiver 10, and locking bracket 20 becomes locked in receiver 10. When the attendant wishes to quickly disconnect the image-intensifier 160 from the linkage assembly, he pushes the lever 31 in the direction indicated by the arrow in FIG. 2. This cams the pop pin 50 to the left, as viewed in FIG. 2, compressing spring 54 and withdrawing the nose of pin 50 from hole 15 in receiver 10. The attendant then quickly lifts the locking bracket 20 from the receiver 10, as illustrated in FIG. 4, allowing spring 63 to move the spring-loaded plunger 60 to the left. This withdraws pin 68 from notch 74 in end flange 73 of shaft 71. The spring-loaded locking trigger arm 76 then enters notch 74, as seen in FIG. 4, and prevents rotation of shaft 71, thus locking the image-intensifier against angular movement. The image-intensifier has now been uncoupled from the linkage assembly so that the attending physician is able to quickly push the image-intensifier away from the patient.

What is claimed is:

1. Connector means for quick connection and disconnection of coaxially aligned first and second cylindrical shaft members in preselected angular orientation with respect to each other, said second shaft member having an end flange, said connector means comprising:
    a. an adapter connectable to said end flange of said second cylindrical members, said adapter including a portion having a key-hole shaped cross-section;
    b. a locking-bracket receiver having a lateral portion of circular C-shaped cross-section for receiving the cylindrical upper portion of said key-hole shaped adapter;
    c. said receiver having a vertical portion of flattened C-shape cross-section forming a chamber, said vertical portion including an upward extension having a hole for receiving a lock pin;
    d. a locking bracket having a body portion having a cylindrical bore for receiving said first cylindrical member, said bracket having a vertical extension corresponding to the vertical extension of said receiver, said extension having a hole therethrough for receiving a lock pin;
    e. a housing having a lock pin therein;
    f. means mounting said housing onto said vertical extension of said locking bracket such that said lock pin is aligned with said hole;
    g. spring means urging said lock pin toward said hole in said locking-bracket extension;
    h. lever-and-cam means for maintaining said lock pin in said holes in said locking bracket and receiver, and for retracting said lock pin, and for maintaining said lock pin retracted.

2. Connector means according to claim 1 wherein:
    a. said adapter has a horizontal cavity in its lower portion;
    b. a spring-loaded plunger within said cavity;
    c. the wall of said vertical portion of said receiver has a hole therethrough for receiving the head of said spring-loaded plunger;

d. said plunger has a shank which extends horizontally through said adapter housing and has a slide block affixed to its external end;

e. said slide block has a horizontally projecting pin adapted to enter a notch in said end flange of said second cylindrical member.

3. Connector means according to claim 2 wherein said receiver chamber is open at its upper end into which said locking bracket is adapted to be inserted.

4. Connector means according to claim 3 wherein said locking bracket has a camming surface at its lower end, said camming surface adapted to engage the head of said spring-loaded plunger and to cause said plunger to move said slide-block pin into said notch in said end plate of said second cylindrical member.

* * * * *